United States Patent Office 2,966,496
Patented Dec. 27, 1960

2,966,496
PRODUCTION OF N-VINYLOXAZOLIDONE

Wolfgang Arend and Hans-Georg Trieschmann, Ludwigshafen (Rhine), Germany, assignors to Badische Anilin- & Soda - Fabrik Aktiengesellschaft, Ludwigshafen (Rhine), Germany No Drawing. Filed Jan. 4, 1956, Ser. No. 557,231

Claims priority, application Germany Jan. 8, 1955

4 Claims. (Cl. 260—307)

This invention relates to N-vinyloxazolidone and to a process for the production of this compound.

It is already known that it is impossible to convert oxazolidone into N-vinyloxazolidone by direct vinylation reactions.

We have now found that N-vinyloxazolidone especially interesting for the production of valuable polymers is obtained in good yields by treating the β-chloroethyl ester of β-chloroethylcarbamic acid

in the presence of an inert solvent with an agent combining with hydrogen chloride.

That inexpensive and readily accessible carbamic acid ester which serves as initial material can be obtained for example in known manner by treatment of ethylene chlorhydrin with phosgene and chloroethylamine hydrochloride. As an agent which combines with hydrogen chloride or as a hydrogen chloride bining agent there may be used, for instance, alcoholates, preferably alkali metal and alkaline earth metal alcoholates, of monohydric alcohols, in particular monohydric aliphatic saturated alcohols. We prefer to use the alkali and alkaline earth alcoholates of the lower aliphatic saturated monohydric alcohols, such as sodium methylate, potassium methylate, lithium methylate, calcium methylate, barium methylate, sodium ethylate, potassium ethylate, calcium ethylate, sodium butylate, potassium butylate, and calcium butylate. Instead of alcoholates of monohydric alcohols, there may also be used, however, alcoholates of polyhydric alcohols, as for example the sodium, potassium or calcium alcoholates of glycol, glycerine, butanediol. Oxides or hydroxides of the alkali or alkaline earth metals, as for example calcium oxide, barium oxide, sodium hydroxide, potassium oxide or lithium oxide, and also calcium hydroxide, caustic soda or caustic potash, are also suitable for splitting off the hydrogen chloride. As this list shows the hydrogen chloride binding agents are inorganic or organic compounds having an alkaline reaction when dissolved in water.

The reaction may be represented by the following formula:

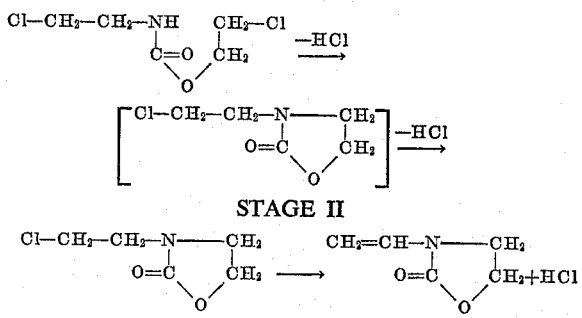

Since a splitting off of two molecules of hydrogen chloride takes place via the stage of the chloroethyl oxazolidone formed as an intermediate product, the reaction can also be carried out in stages or the chloroethyl oxazolidone occurring as an intermediate product can itself be used as initial material. The stagewise operation has the advantage that still better yields are obtained.

The reaction takes place in the presence of inert solvents, preferably anhydrous solvents, such as petroleum ether, tetrahydrofurane, lower molecular weight alcohols, as for example methanol, ethanol, propanol or butanol or aromatic hydrocarbons, such as benzene, toluene or xylene. The term "inert solvents" as used herein relates to organic solvents which do not react with the β-chloroethyl carbamic acid-β-chloroethyl ester nor with the N-vinyl oxazolidone, nor with the intermediate products and the hydrogen chloride.

Generally speaking the reaction is carried out at temperatures between 15° and 80° C., in particular between about 20° and 60° C., but lower temperatures, as for example 0° C., and also higher temperatures, as for example 100° or 150° C., can also be used.

The reaction is preferably carried out by introducing the agent for combining with hydrogen chloride continuously or periodically into a solution or suspension of the ester. Working in this way has the advantage that the reaction proceeds quietly, the whole of the hydrogen chloride is bound immediately after its formation and no undesirable side reactions, as for example, by polymerization of the N-vinyloxazolidone or splitting of the oxazolidone ring, take place. The agent for combining with hydrogen chloride can be introduced into the solution or suspension of the ester in solid form or also dissolved, for example in alcoholic solution, or in suspended form. The reaction is completed when no more of the agent combining with hydrogen chloride is consumed, i.e. when the reaction mixture has a weak alkaline reaction and its pH value no longer undergoes change.

The N-vinyloxazolidone obtained is a valuable intermediate product which may be used, e.g., for the production of pharmaceutical products or of textile auxiliaries. Of particular interest is the polymerization of N-vinyloxazolidone. The homopolymers of the N-vinyloxazolidone are water soluble products which may be used as sizing, impregnating and finishing agents. The N-vinyloxazolidone may also be copolymerized with other monomers such as N-vinyllactams, e.g., N-vinyl-α-pyrrolidone or N-vinylcaprolactam or other unsaturated compounds, such ac acrylic acid or its derivatives or homologues. The polymerization reaction may be activated by small amounts of a polymerization accelerator, such as benzoyl peroxide, hydrogen peroxide, or alkali sulfite. Bulk polymerization or polymerization in solution while using water or organic liquids as solvents at temperatures varying from 20°–100° C. are of interest.

The following Examples will further illustrate this invention but the invention is not restricted to these examples. The parts are parts by weight.

Example 1

2,200 parts of β-chloroethylcarbamic acid-β-chloroethyl ester (obtained by the reaction of 1,870 parts of chloroformic acid-β-chloroethyl ester with 1,515 parts of chloroethylamine hydrochloride) are dissolved in 4,000 parts of methanol and 500 parts of sodium hydroxide are added in portions while stirring vigorously at about 35° C. The whole is then stirred for some hours, the precipitated common salt is filtered off and 1,580 parts of N-chloroethyloxazolidone are obtained by distillation at 122° to 124° C. at a pressure of 1 torr (1 mm. of mercury). This is dissolved in 4,000 parts of anhydrous benzene and while stirring at room temperature there are added in portions a total of 790 parts of sodium monoxide, care being taken by cooling that the temperature does not exceed about 40° C. After all the sodium monoxide has been added, the whole is heated to the boiling temperature in the course of 1 to 2 hours and then heated for another 7 hours under reflux. It is then allowed to cool, the precipitated NaCl is filtered off and 1,050 parts of N-vinyl-oxazolidone (boiling point at 1.3 torr, 100° to 105° C.) are obtained by distillation.

*Example 2*

150 parts of N-β-chloroethyloxazolidone (obtained as described in Example 1) are dissolved in 400 parts of petroleum ether, and 65 parts of sodium methylate are added in portions at 10° to 20° C. while stirring. The temperature is gradually raised to about 45° C. and the whole stirred for a further 12 hours. After filtration by suction and removal of the solvent, 88 parts of N-vinyl-oxazolidone are obtained by distillation under reduced pressure.

*Example 3*

120 parts of sodium methylate are introduced in portions at room temperature while stirring vigorously into a solution of 186 parts of β-chloroethylcarbamic acid-β-chloroethyl ester in 500 parts of tetrahydrofurane. The whole is further stirred for about 8 hours at 40° C., the precipitated NaCl is filtered off and the solvent removed. 71 parts of N-vinyloxazolidone are obtained by distillation of the residue under reduced pressure.

*Example 4*

This example serves to illustrate the polymerization of N-vinyloxazolidone.

A mixture of 100 parts of N-vinyloxazolidone, 200 parts of ethanol, 10 parts of water and 10 parts of 3% hydrogen peroxide is heated to boiling under reflux for 5 hours. After distilling the solvent, a solid, colorless polymer is left in a quantitative yield, the polymer having a K-value of 28 and a softening point of 120° C. It is soluble in water forming a gelatinous solution of higher or lesser viscosity according to its concentration.

A 2% aqueous solution of this polymer may be used as sizing agent for regenerated cellulose yarn. The sizing composition is applied in conventional manner. After sizing the yarns are spooled without difficulty. The clear viscous solution of the polymer may also be used as impregnant for fibrous materials, e.g. textiles on the basis of natural or regenerated cellulose, paper, leather etc.

We claim:

1. A process of manufacturing N-vinyloxazolidone by splitting off hydrogen chloride from N-β-chloroethyloxazolidone with sodium methylate at a temperature between 15 and 80° C. in the presence of an inert anhydrous organic solvent.

2. A process of manufacturing N-vinyl-oxazolidone by splitting off hydrogen chloride from N-β-chloroethyl oxazolidone with sodium monoxide at a temperature between 15° and 80° C. in the presence of an inert anhydrous organic solvent.

3. A process of manufacturing N-vinyloxazolidone which comprises reacting the N-β-chloroethyl ester of β-chloroethyl carbamic acid with at least the equivalent amount of sodium methylate at a temperature between 15° and 80° C. in the presence of an inert organic anhydrous solvent.

4. A process of manufacturing N-vinyloxazolidone which comprises reacting the N-β-chloroethyl ester of β-chloroethyl carbamic acid with at least the equivalent amount of sodium monoxide at a temperature between 15° and 80° C. in the presence of an inert organic anhydrous solvent.

References Cited in the file of this patent

UNITED STATES PATENTS

| | | |
|---|---|---|
| 2,369,485 | Nichols | Feb. 13, 1945 |
| 2,786,043 | Schuller et al. | Mar. 19, 1957 |
| 2,818,399 | Drechsel | Dec. 31, 1957 |

FOREIGN PATENTS

| | | |
|---|---|---|
| 880,654 | Germany | June 22, 1953 |

OTHER REFERENCES

Pierce: J. Am. Chem. Soc., vol. 50, pp. 241–244 (1928).

Katchalski et al.: Chem. Abst., vol. 45, col. 2933 (1951).

McKay et al.: Chem. Abst., vol. 46, cols. 9559–9560 (1952).